United States Patent [19]

Chandrasekhar et al.

[11] Patent Number: 5,577,138
[45] Date of Patent: Nov. 19, 1996

[54] INTEGRATED-CIRCUIT OPTICAL NETWORK UNIT

[75] Inventors: S. Chandrasekhar, Matawan; Andrew G. Dentai, Atlantic Highlands, both of N.J.

[73] Assignee: Lucent Technologies Inc., Murray Hill, N.J.

[21] Appl. No.: 516,472

[22] Filed: Aug. 17, 1995

[51] Int. Cl.[6] .................... G02B 6/12; H04B 10/00
[52] U.S. Cl. .................. 385/14; 385/24; 385/31; 385/39; 385/49; 385/1; 385/2; 385/131; 359/154; 359/173
[58] Field of Search .................. 385/14, 15, 24, 385/27, 31, 39, 49, 50, 124, 130, 131, 1, 2, 4, 8, 40; 359/154, 173, 245, 333, 341

[56] References Cited

U.S. PATENT DOCUMENTS

| | | | |
|---|---|---|---|
| 4,997,246 | 3/1991 | May et al. | 385/2 X |
| 5,005,933 | 4/1991 | Shimuzu | 385/2 |
| 5,105,433 | 4/1992 | Eisele et al. | 372/50 |
| 5,117,469 | 5/1992 | Cheung et al. | 385/11 |
| 5,134,671 | 7/1992 | Koren et al. | 385/14 |
| 5,191,625 | 3/1993 | Gustavsson | 385/14 |
| 5,208,878 | 5/1993 | Thulke | 385/14 |
| 5,369,719 | 11/1994 | Mishima et al. | 385/48 |
| 5,402,259 | 3/1995 | Lembo et al. | 385/2 X |
| 5,428,695 | 6/1995 | Ohta | 385/14 |
| 5,479,539 | 12/1995 | Goldsmith et al. | 385/14 |
| 5,502,779 | 3/1996 | Magel | 385/1 |

OTHER PUBLICATIONS

S. Chandrasekhar, "The progress & Performance of Long Wavelength OEIC Photoreceivers Incorporating Heterojunction Bipolar Transistors", 1994, pp. 45–65, Int'l Journal of High Speed Electronics & Systems, vol. 5, No. 1.

*Primary Examiner*—Brian Healy

[57] ABSTRACT

An optical network unit designed to be connected to incoming and outgoing fibers at a customer location is made in integrated-circuit form. One portion of the integrated circuit includes a thin-film waveguiding layer and functions as an optical splitter, a photodetector and a modulator. Another portion of the circuit serves as an amplifier..

11 Claims, 5 Drawing Sheets ial signals generated by the photodetector. In that way, electrical signals representative of incoming information can be supplied to each customer. Further, electrical signals from each customer can be utilized to modulate that part of the incoming optical signal that is routed back to the outgoing fiber via the modulator in the optical network unit.

INTEGRATED-CIRCUIT OPTICAL NETWORK UNIT

BACKGROUND OF THE INVENTION

This invention relates to a communication system utilizing optical fibers and, more particularly, to a unit that functions as an interface between incoming and outgoing fibers and individual customers connected to the system.

Due primarily to their low-loss and high-bandwidth characteristics, optical fibers are utilized in a wide variety of communication systems of practical importance. For some time, such utilization has been seen as particularly attractive in long-haul systems. Although relatively expensive terminal equipment is typically required in a long-haul system, the cost of the equipment is in effect shared by tens of thousands of individual customers served by the system.

More recently, considerable development effort has been directed at trying to devise economical optical-fiber systems capable of delivering broadband signals (for example, voice, data and video) directly to customer premises. One such approach involves running optical fiber from a central office to each customer location and providing a so-called optical network unit between the fiber and the customer. An incoming optical signal can be thereby constantly applied from the central office to each network unit. In each unit, the incoming optical signal is split into two portions. One portion is detected and then applied as an electrical signal to the customer equipment. Another portion of the incoming optical signal is modulated with electrical signals from the customer and then sent in the form of an outgoing optical signal back to the central office.

Significantly, the aforedescribed optical network unit does not require an optical source such as a laser. The only optical source in the overall system is typically located in the central office. Accordingly, the need for wavelength control and timing accuracy at each customer location is thereby obviated.

Nevertheless, optical network units as heretofore envisioned are relatively large and costly. A straightforward approach to the design of such a unit that includes an optical splitter, a photodetector, a modulator and an electrical anplifier involves simply interconnecting conventional discrete components. The resulting multi-component unit, however, is typically relatively bulky and expensive and requires, for example, four fiber connectors and three electrical connectors.

Accordingly, considerable efforts have been directed by workers skilled in the art aimed at attempting to develop an optical network unit that is characterized by relatively low cost, compactness, simplicity and reliability. It was recognized that these efforts, if successful, could provide an important practical basis for achieving economical broadband service to individual customers.

SUMMARY OF THE INVENTION

In accordance with the principles of the present invention, an optical network unit designed to be connected to incoming and outgoing fibers at a customer location is made in integrated-circuit form in a batch-fabrication process. One portion of the integrated circuit comprises a multi-layered monolithic structure that functions as an optical splitter, a photodetector and a modulator. A second spaced-apart portion of the same integrated-circuit comprises a multi-layered monolithic structure that functions as an amplifier for electrical signals generated by the photodetector. In that way, electrical signals representative of incoming information can be supplied to each customer. Further, electrical signals from each customer can be utilized to modulate that part of the incoming optical signal that is routed back to the outgoing fiber via the modulator in the optical network unit.

In more specific accord with the invention, the first-mentioned multilayered portion comprises a waveguiding layer. Incoming optical signals applied to the network unit are launched into one end of the waveguiding layer, and outgoing optical signals are abstracted from the other end of the layer. Some of the incoming signal is absorbed by photodetecting layers disposed adjacent to an input section of the waveguiding layer. The resulting electrical signals generated by the photodetecting layers are applied to customer equipment associated with the network unit. The unabsorbed portion of the optical signal continues to propagate in the waveguiding layer and subsequently traverses an output section of that layer which is electrically isolated from the input section. By means of layers disposed on either side of the output section of the waveguiding layer, an electrical signal from the associated customer equipment is utilized to modulate the unabsorbed portion of the optical signal before it exits from the waveguiding layer.

BRIEF DESCRIPTION OF THE DRAWINGS

A complete understanding of the present invention and of the above and other features and advantages thereof may be gained from a consideration of the following detailed description presented hereinbelow in connection with the accompanying drawing, not drawn to scale, in which.

DETAILED DESCRIPTION

Figure 1:
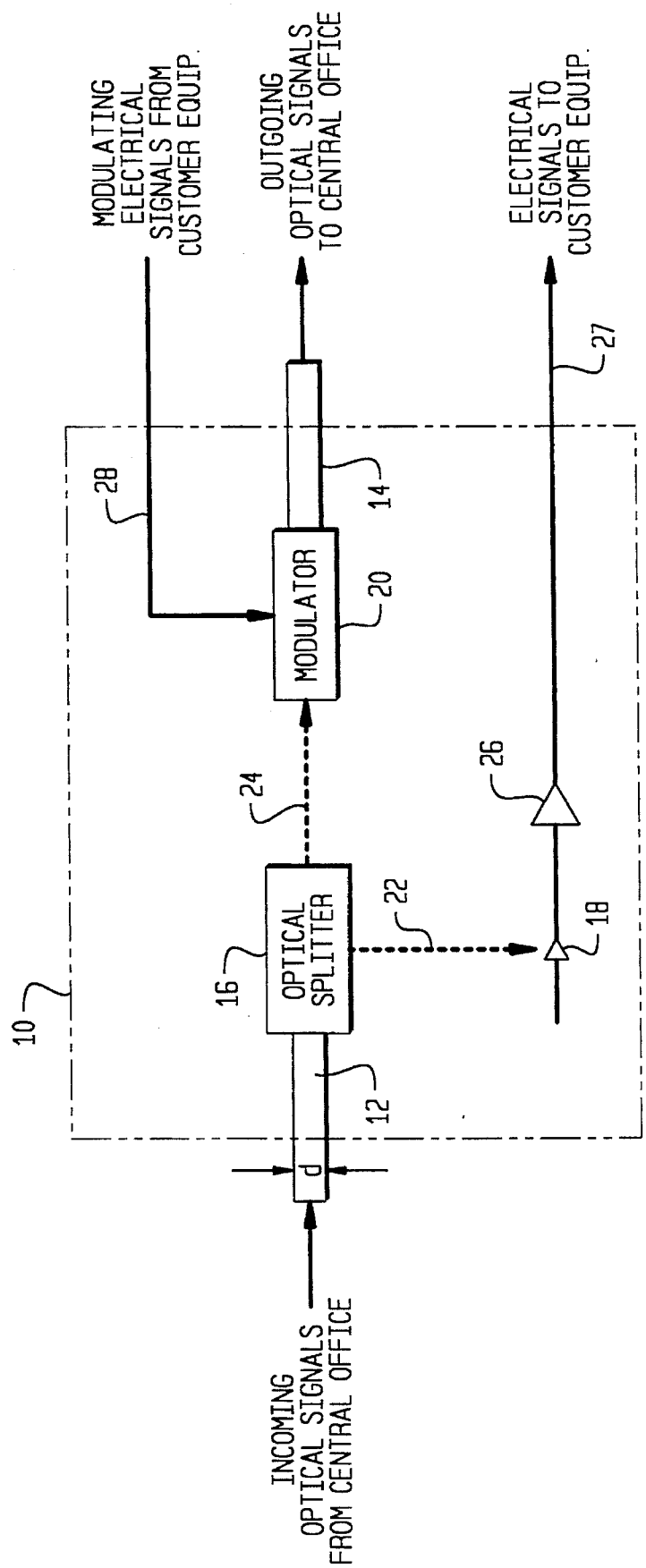
FIG. 1 is a schematic representation of a known type of optical network unit to which the principles of the present invention are applicable.

A simplified schematic depiction of a conventional optical network unit is shown in FIG. 1 within dash-line box 10. Incoming optical signals from, for example, a central office are applied to the unit 10 via an input optical fiber 12. Outgoing optical signals from the unit 10 are propagated via an output optical fiber 14. Illustratively, the fibers 12 and 14 are conventional single-mode fibers made, for example, of doped silica glass. The overall diameter d of each such fiber is, for example, about 125 micrometers (µm). By way of example, the signal-carrying core of the fiber has a diameter of approximately six µm. Advantageously, the carrier frequency of the incoming and outgoing optical signals is centered at a wavelength of 1.55 µm, which is the lowest-loss wavelength of such conventional fibers.

Incoming optical signals on fiber 12 of FIG. 1 are applied to a conventional optical splitter 16. One portion of the incoming signal (for example, about ninety percent) is directed by the splitter 16 to a standard photodetector 18 (represented as a p-n photodiode), while the remaining portion of the incoming signal is routed by the splitter 16 to a modulator 20. Dash lines 22 and 24 respectively represent the propagation of optical signals from the splitter 16 to the photodetector 18 and to the modulator 20.

The photodetector 18 of FIG. 1 provides an electrical output signal which is applied to an amplifier 26. In turn, the output of the amplifier 26 is applied via electrical lead 27 to standard customer equipment such as, for example, telephone, computer or television equipment. In that way, any information impressed on the optical carrier at the central office is detected in the unit 10 and then delivered to the customer.

On the other hand, information in the form of electrical signals that the customer wishes to transmit to the central office is applied to the modulator 20 of FIG. 1 via electrical lead 28. In the modulator 20, a portion of the incoming optical signal (represented by the dash line 24) is selectively altered in accordance with the electrical signals on the lead 28. As a result, a modulated version of that portion of the incoming optical signal is applied by the modulator 20 to the fiber 14 for propagation to the central office.

Figure 3:
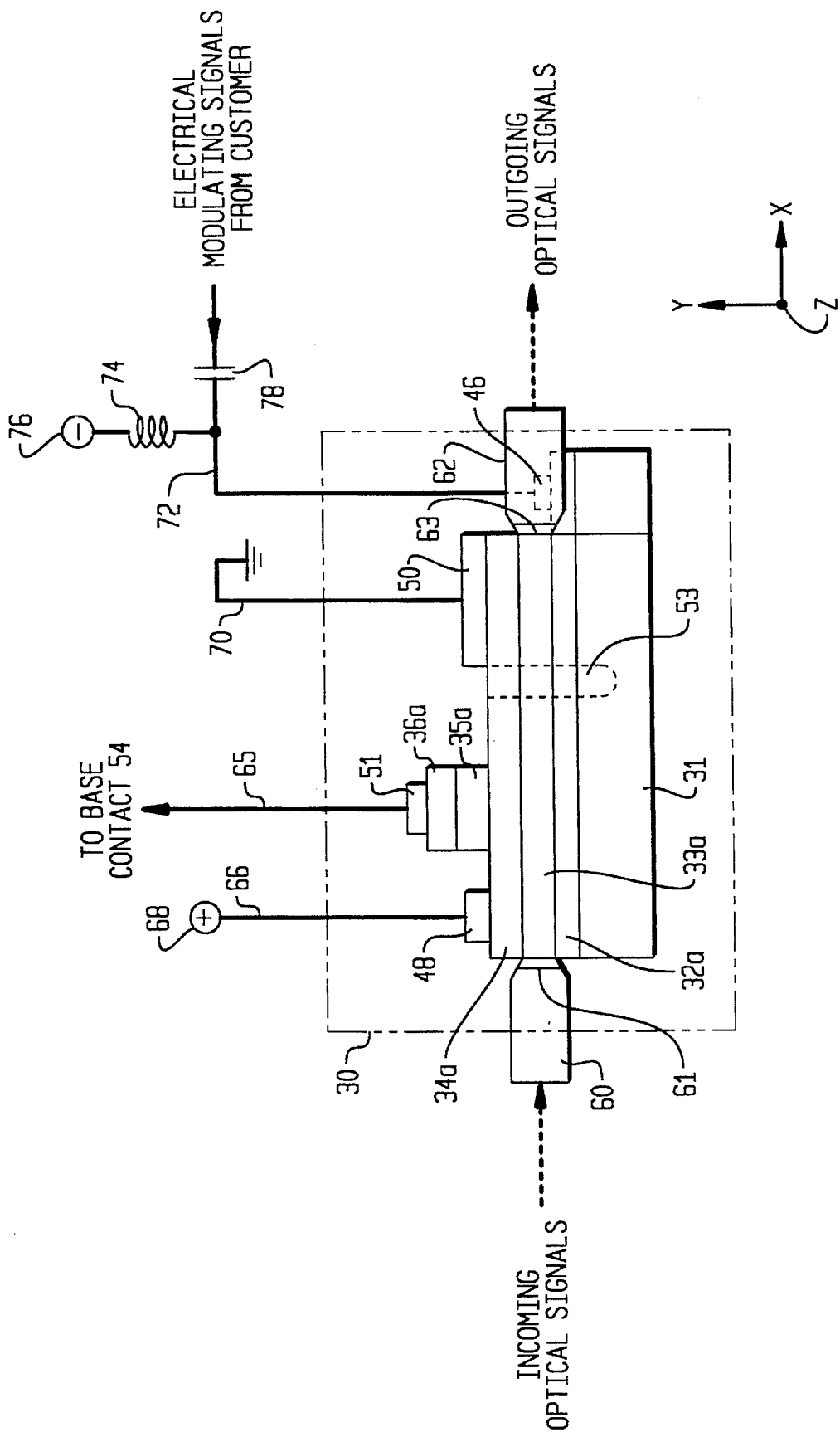
FIG. 3 shows one portion of the FIG. 2 structure after it has been processed in accordance with the present invention.
Figure 4:
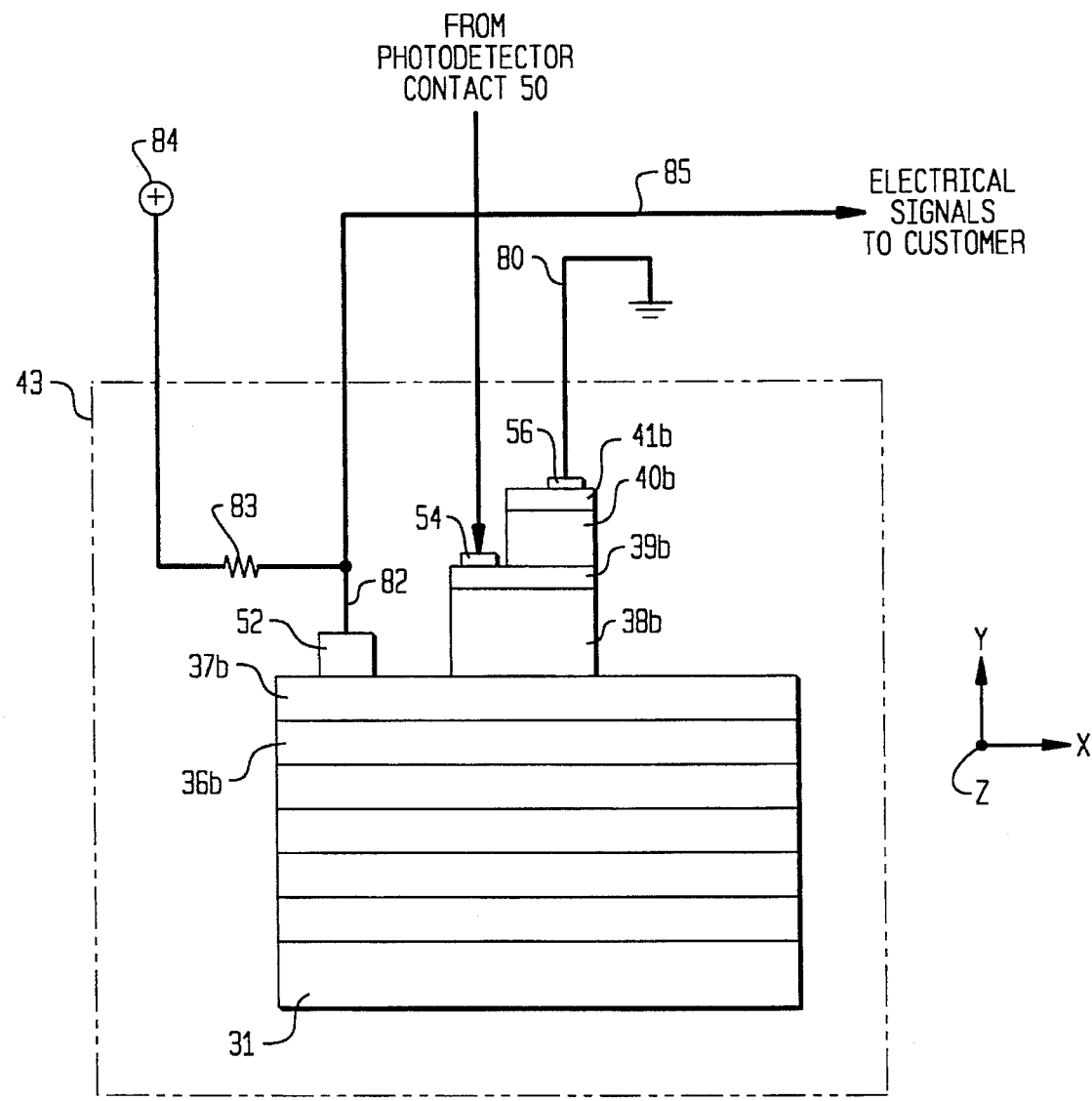
FIG. 4 shows another portion of the FIG. 2 structure alter it has been processed in accordance with the invention.

In accordance with the principles of the present invention, the entire unit 10 of FIG. I is fabricated as an integrated-circuit structure. Illustratively, such a structure is made by initially depositing, layer by layer, the specific multi-layered arrangement shown in FIG. 2. Then, by following conventional lithographic, etching, metal-deposition and other standard steps well known in the semiconductor processing art, the FIG. 2 arrangement is processed to form a particular illustrative integrated-circuit unit having two spaced-apart components 30 and 43 which are shown, respectively, in FIGS. 3 and 4. As will be described in detail below, the integrated-circuit unit whose respective components are contained within the dash-line boxes 30 and 43 of FIGS. 3 and 4 is functionally equivalent to the aforespecified unit 10 shown in FIG. 1.

Figure 2:
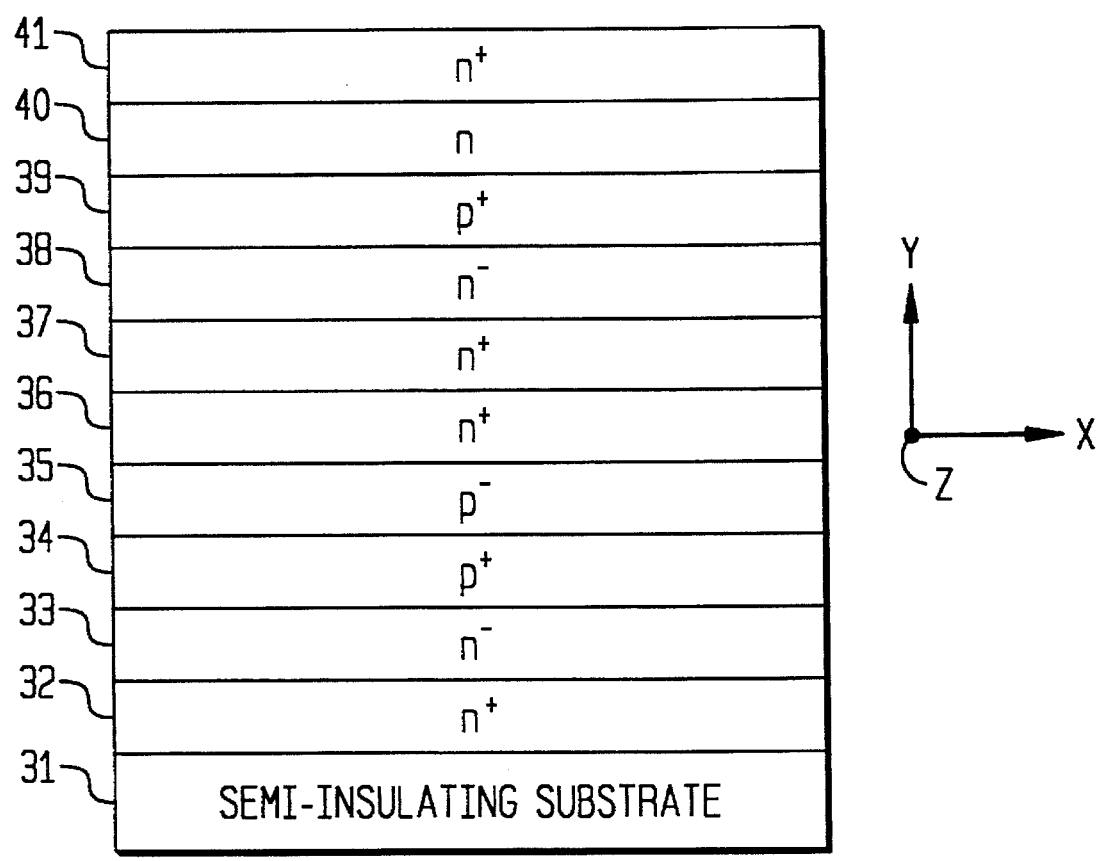
FIG. 2 is a cross-sectional view of a multi-layered structure from which, in accordance with the invention, the individual components of FIG. 1 are to be made in integrated-circuit form.

Illustratively, the FIG. 2 structure comprises ten epitaxial layers deposited in sequence on the planar top surface of a standard semi-insulating substrate 31 that comprises a wafer made, for example, of indium phosphide (InP). The substrate 31 has, for example, a Y-direction thickness of about 100- to-400 μm. Illustratively, the layers shown in FIG. 2 are deposited by conventional metal-organic-vapor-phase epitaxy (MOVPE). But other standard and well known alternative techniques, such as molecular-beam epitaxy (MBE), are also available for forming the indicated layers.

By way of a specific illustrative example, the first layer deposited on the top X-Z planar surface of the substrate 31 of FIG. 2 comprises an n$^+$-doped layer 32 of InP about 0.5 μm thick. In the completed device, the layer 32 serves as an electrical contact layer for overlying layer 33.

The layer 33 comprises a waveguiding layer for optical signals propagated in the X or horizontal direction of FIG. 2. The layer 33 is made of a material whose band edge shifts as a function of applied electric field. Illustratively, the material of the layer 33 is selected such that, in the absence of an applied electric field, the layer 33 absorbs relatively little of any 1.55-μm optical signal propagated therein in the X direction. On the other hand, the layer 33 is designed to absorb most of any horizontally propagating 1.55-μm optical signal when a Y-direction electric field of at least a specified value is applied across a portion of the layer 33. In that case, virtually no optical signal launched into one end (a Y-Z face) of the layer 33 is emitted from the other end thereof. In that way, electrical signals can be utilized to modulate optical signals propagated in the waveguiding layer 33.

Various suitable materials are available for making the waveguiding layer 33. One specific illustrative such material is n$^-$-doped $In_{0.65}Ga_{0.35}As_{0.7}P_{0.3}$. By way of a particular example, the layer 33 has a Y-direction thickness of about 0.4 μm and a Z-direction extent of approximately five μm. In the device to be formed from the FIG. 2 structure, the X-direction length of the waveguide derived from the layer 33 is in practice, for example, about 300 μm.

Layer 34 overlying the waveguiding layer 33 of FIG.2 comprises, for example, a 0.2-μm-thick layer of p$^+$-doped InP. The layer 34 serves as an electrical contact layer. Electrical contacts will later be made to the contact layer 34 and to the aforementioned contact layer 32. And electrical leads will be respectively connected to those contacts. By means of those leads, an electric field can be applied to a specified portion of the waveguiding layer 33 to modulate optical signals propagated therein. Additionally, the layer 34 serves as a contact layer for a photodetecting portion of the device.

The layer 35 of FIG. 2 is made, for example, of p$^-$-type $In_{0.53}Ga_{0.47}As$ and has a thickness of about 0.5 μm. In turn, contact layer 36 is formed overlying the layer 35. Illustratively, the layer 36 comprises an n$^-$-doped layer of InP about 0.5 μm thick.

In the final device structure, portions of the contact layers 34 and 36 of FIG. 2, together with a portion of the layer 35, form a p-n photodiode. The evanescent field associated with an incoming optical signal propagating in the waveguiding layer 33 extends into the photodiode and generates electron-hole pairs therein. An electrical signal is thereby generated in response to the incoming signal. Thus, by making electrical contacts to the layers 34 and 36, an electrical signal representative of the incoming optical signal can be obtained.

In the portion of the completed integrated circuit that will be described in connection with FIG. 3, the aforedescribed layers 32 through 36 are utilized to define a waveguiding layer 33, a photodetector/optical splitter and a modulator. The remaining layers 37 through 41 of FIG. 2 that overlie the layer 36 are utilized to define an amplifier (for example, a heterojunction bipolar transistor) such as the one depicted in FIG. 4. These remaining layers 37 through 41 will not, however, be employed in the FIG. 3-portion of the final device structure. All the layers required for the FIG. 3 structure already exist once the layer 36 has been deposited.

Subsequent to forming the layer 36 of FIG. 2, an n$^-$-doped contact layer 37 made, for example, of InGaAs approximately 0.4 μm thick is deposited. Next, layers 38 through 41 shown in FIG. 2 are formed. Illustratively, the layer 38 comprises n$^-$-type InGaAs about 0. 5 μm thick, the layer 39 comprises p$^+$-type InGaAs approximately 0.05 μm thick, the layer 40 comprises n-type InP about 0.1μm thick, and the layer 41 comprises n$^+$-type InGaAs approximately 0.1 μm thick.

In the FIG. 4 portion of the completed integrated circuit, a portion of the n$^-$-type layer 38 of FIG. 2 will constitute the collector region of one or more conventional n-p-n heterojunction bipolar transistors. A portion of the p$^+$-type layer 39 will constitute the base region(s) thereof, and a portion of the n-type layer 40 will constitute the emitter region(s). A portion of the layer 41 will constitute a contact layer for the emitter region. Contact to the base region of the transistor will be made via a metallic contact formed on the layer 39, and contact to the collector region, via the layers 36 and 37, will be made via a metallic contact formed on the layer 37.

Layer by layer, the multi-layered structure of FIG. 2 is then processed utilizing conventional techniques well known in the integrated-circuit art to form an optical network unit that embodies the principles of the present invention. By such standard techniques, the FIG. 2 structure is processed to form the units 30 and 43 shown in FIGS. 3 and 4, respectively. As stated earlier above, the integrated-circuit units 30 and 43 are together functionally equivalent to the unit 10 of FIG. 1.

The arrangements shown separately in FIGS. 3 and 4 actually constitute different electrically isolated portions of the processed FIG. 2 structure. In one such portion, the layers 38 through 41 of FIG. 2 are first etched away and then the FIG. 3 structure is defined. In another portion, which is, for example, spaced apart from the first-mentioned portion in the indicated Z direction by etching a trench through the layers on the substrate 31, the layers 38 through 41 are processed to define the FIG. 4 structure. Both portions are defined on the same substrate 31, and multiple such pairs of portions can be fabricated in a single batch-fabrication process. Multiple relatively low-cost and robust solid-state optical network units can thus be made by such a process.

For ease in establishing a correspondence between FIG. 2 and FIGS. 3 and 4, each of the layers 32 through 41 of FIG. 2 retains its reference number in FIGS. 3 and 4 even after having been patterned to form elements of the devices 30 and 43. In FIG. 3, a letter (a) has been added to the retained number to signify that that portion of a particular layer is a part of the device 30, whereas in FIG. 4 another letter (b) has been added to the retained number to indicate that that portion of a particular layer is a part of the device 43.

In conventional ways well known in the art, metallic contacts are made to portions of the layers 32a, 34a and 36a of FIG. 3 and to portions of the layers 37b, 39b and 41b of FIG. 4. Subsequently, the entire structure comprising the units 30 and 43 of FIGS. 3 and 4 is typically overlaid with a suitable dielectric material (not shown) such as a standard polyimide. The dielectric material is then etched to open windows directly overlying the metallic contacts. And conductive interconnect lines are then defined on the surface of the dielectric material to connect the units to each other and to specified points external to the units.

Specifically, metallic contact 46 is formed on the layer 32a of FIG. 3, metallic contacts 48 and 50 are formed on the layer 34a of FIG. 3, and contact 51 is formed on the layer 36a of FIG. 3. Further, metallic contact 52 is formed on the layer 37b of FIG. 4, contact 54 is formed on the layer 39b of FIG. 4, and contact 56 is formed on the layer 41b of FIG. 4. Advantageously, for the p$^+$-doped layers 34a and 39b, the metallic contacts 48, 50 and 54 formed thereon are, for example, standard gold/zinc-gold two-layer contact structures. And, for the n$^+$-doped layers 32a, 36a, 37b and 41b, the metallic contacts 46, 51, 52 and 56 are, for example, standard gold/germanium-gold two-layer contact structures.

In FIG. 3, contacts 48 and 51 constitute the contacts for the p-n photodiode that comprises the layers 34a, 35a and 36a. As an incoming optical signal propagates through the left-hand or input section of the waveguiding layer 33a, an electrical signal is generated in the depicted photodiode. This signal is applied to the amplifier contained in the unit 43 shown in FIG. 4 by an electrical interconnect line which in FIG. 3 is represented simply as a lead 65. (In practice, the lead 65 and the other leads emanating from the depicted contacts constitute, for example, standard interconnect lines formed on the surface of the aforementioned dielectric material by patterning a layer of a suitable conductive material such as chromium/gold.) Illustratively, the other photodetector contact 48 is connected via electrical interconnect line 66 to a direct-current bias supply 68 having a value or; for example, about +5 volts.

As schematically depicted in FIG. 3, an optical fiber stub 60 is utilized to apply incoming optical signals to the entry face of the waveguiding layer 33a of the unit 30. Similarly, optical signals emanating from the exit face of the waveguiding layer 33a are applied to an optical fiber stub 62. In practice, the X or longitudinal axes of the stubs 60 and 62 and of the layer 33a are substantially colinear.

To facilitate efficient transfer of optical signals from the stub 60 to the layer 33a and from the layer 33a to the stub 62, it is advantageous to form a conventional microlens 61 on the right-hand end of the input stub 60 and another one 63 on the left-hand end of the output stub 62. In turn, these microlenses are typically spaced several micrometers away from the respective entry and exit faces of the layer 33a. In that way, relatively low-loss optical coupling between the cores of the stubs 60 and 62 and the waveguiding layer 33a is achieved.

In accordance with the principles of the present invention, a portion of the incoming optical signal applied to the waveguiding layer 33a of FIG. 3 is absorbed by the aforedescribed photodetector. The remaining portion of the optical signal continues to propagate in the layer 33a. Subsequently, as described in detail later below, the remaining signal passes through a right-hand or output section of the layer 33a where, depending on whether a transverse (Y direction) modulating electric field is applied or not to the layer 33a, most of the propagating signal is absorbed or not absorbed, respectively. If not absorbed, the propagating signal exits from the layer 33a and is applied to the output fiber stub 62.

Significantly, the percentage of the incoming optical signal that is absorbed by the photodetecting portion of FIG. 3 can be designed to be a specified value. During fabrication, this is done by selecting the X-direction extent of the layers 35a and 36a to be a predetermined value. In one particular illustrative case, where this extent or interaction length is approximately forty μm, about ninety percent of the incoming signal is absorbed. By increasing or decreasing this interaction length, more or less, respectively, of the incoming signal is absorbed by the photodetecting layers. In that way, the optical splitting function performed in the unit 30 by the photodetector can be easily designed to meet particular operating requirements.

As noted, the optical-signal-splitting function carried out in the unit 30 of FIG. 3 is performed by the photodetecting portion of the structure. By absorbing some of the incident optical signal and thus permitting only a remaining portion thereof to propagate in the depicted structure, the photodetector performs both functions of the individual discrete components 16 and 18 shown in FIG. 1. No separate and distinct optical splitter element, as shown in FIG. 1, is required in FIG. 3. Clearly, therefore, the FIG. 3 unit (together with the amplifier of FIG. 4), while functionally equivalent to the FIG. 1 arrangement, is not simply a component-by-component integrated-circuit substitution therefor.

Contacts 46 and 50 of FIG. 3 constitute the means by which an electrical modulating signal is applied to a right-hand section of the waveguiding layer 33a from customer equipment. As specified earlier above, the contacts 46 and 50 are formed on the contact layers 32a and 34a, respectively. So as to allow room for the output fiber stub 62 to be positioned in alignment with the exit face of the layer 33a, the contact 46 is formed on a portion of the layer 32a and of the underlying substrate 31 that are displaced sufficiently in the Z direction to allow adequate clearance for the stub 62.

The modulator contact 50 shown in FIG. 3 is connected via interconnect line 70 to a point of reference potential such as ground. And the modulator contact 46 is connected via interconnect line 72 and an inductor 74 to a direct-current bias supply 76 having a value, for example, which is between −5 and −10 volts. As indicated in FIG. 3, the modulator contact 46 is also connected via a capacitor 78 to receive modulating electrical signals from customer equipment.

To ensure reliable operation of the FIG. 3 arrangement, it is important to electrically isolate the photodetector of FIG. 3 from the modulator thereof. This is done, for example, by providing an isolation region 53 that extends through the layers 34a, 33a and 32a. Illustratively, the region 53 comprises an etched trench having an X-direction extent of about five μm. Or the region 53 may comprise a proton-implanted region. In either case, effective electrical isolation between the modulating signal and the photodetected signal is thereby provided.

The aforedescribed modulator that is associated with the right-hand section of the waveguiding layer 33a of FIG. 3 comprises a conventional electro-absorptive device. In particular, the modulator includes a p-n junction formed between the layers 33a and 34a. The length (X-direction extent) of this junction to which an electric field is applied defines in effect the interaction length of the modulator. In practice, this length can be made relatively long (illustratively, about 100 μm), whereby a modulator with an extremely high ON/OFF optical signal ratio (for example, about ten db) can be easily realized.

Illustratively, for purposes only of a particular example, the unit 43 of FIG. 4 comprises a single conventional heterojunction bipolar transistor. The depicted transistor includes a collector region 38b, a base region 39b and an emitter region 40b. The layers 36b and 37b constitute contact layers for the collector region 38b. But the remaining layers of the original multi-layered structure shown in FIG. 2 (namely, layers 32 through 35) serve simply as a support for the depicted transistor.

As mentioned earlier above, the electrical signal generated by the photodetecting portion of the unit 30 of FIG. 3 is applied to the base contact 54 of the n-p-n transistor in the unit 43 of FIG. 4. Further, the emitter contact 56 of the depicted transistor is connected via interconnect line 80 to ground. And the collector contact 52 is connected via interconnect line 82 and resistor 83 to a direct-current bias supply 84 having a value, for example, between about +3 and +5 volts. Additionally, the collector contact 52 is connected via interconnect line 85 to customer equipment, thereby to supply to such equipment electrical signals representative of incoming optical signals.

In practice, the resistor 83 shown in FIG. 4 advantageously comprises, for example, a resistive element formed on the surface of the aforementioned dielectric material that overlies the integrated-circuit structure. Illustratively, the resistive element is patterned from a standard layer of nickel/chromium deposited on the dielectric material, in conventional ways well known in the art.

Advantageously, an integrated-circuit optical network unit of the illustrative type described herein can be made and packaged in a relatively low-cost and robust manner. Thus, for example, as schematically depicted in simplified form in FIG. 5, housing 91 is assumed to contain therein an integrated-circuit unit of the particular type depicted in FIGS. 3 and 4. (This unit and fiber stubs 60 and 62 contained within the housing are represented in dash-line outline in FIG. 5.) By means, for example, of conventional rotary optical connectors 92 and 93, input and output fibers 94 and 95 are respectively connected to connector portions mounted on the housing 91. In turn, the optical fiber stubs 60 and 62 are also connected to portions of the connectors 92 and 93 mounted on the housing 91. The stubs are thereby positioned in aligned registry with the fibers 94 and 95.

Figure 5:
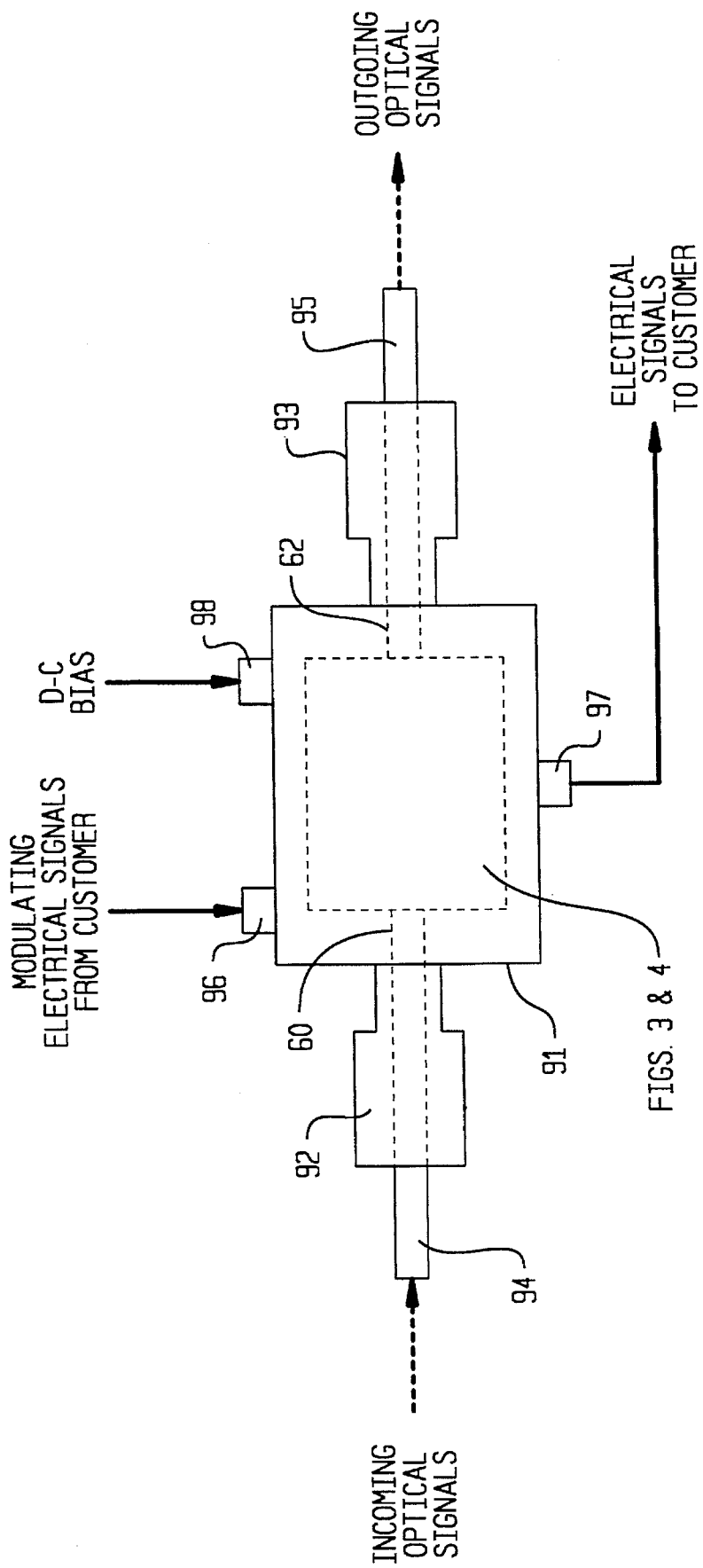
FIG. 5 illustrates a specific manner in which the arrangement represented in FIGS. 3 and 4 can be packaged in a simple module.

FIG. 5 also indicates electrical connectors 96 and 97 mounted on the housing 91. By means of the connector 96, modulating signals are applied from customer equipment to the unit contained in the housing 91 (specifically, to the contact 46 of the modulator shown in FIG. 3). By means of the connector 97, electrical signals from the unit in the housing 91 (specifically, from the collector contact 52 of the transistor of FIG. 4) are applied to customer equipment. Lastly, another electrical connector 98 is utilized to connect the various bias supplies 68, 76 and 84 to the unit contained within the housing 91.

Thus, in accordance with the principles of the present invention, a relatively compact, robust and low-cost optical network unit made in integrated-circuit form is provided. The availability of such units significantly facilitates realization of a communication system in which optical signals can be delivered to and received from individual customers.

Finally, it is to be understood that the above-described arrangements and techniques are only illustrative of the principles of the present invention. In accordance with these principles, numerous modifications and alternatives may be devised by those skilled in the art without departing from the spirit and scope of the invention. A commonly owned application designated S. Chandrasekhar Case 2 Ser. No. 08/516,418) pending, directed to a related embodiment, is being filed concurrently herewith.

What is claimed is:

1. An optical network unit comprising
   a multi-layered integrated-circuit structure including a portion having a longitudinally extending thin-film waveguiding layer having input and output faces,
   photodetecting and optical-signal-splitting means including a first set of layers of said structure disposed adjacent to an input section of said waveguiding layer for absorbing a portion of any optical signal propagating in said waveguiding layer and generating an electrical signal in response thereto while allowing the remaining portion of any optical signal to continue to propagate in said waveguiding layer,
   modulator means including a second set of layers of said structure disposed adjacent to an output section of said waveguiding layer for applying a transverse electric field to said waveguiding layer,
   means extending transversely through the layers of said structure for providing electrical isolation between said photodetecting and optical-signal-splitting means and said modulator means,
   input means for applying an input optical signal to the input face of said waveguiding layer,
   and output means for abstracting output optical signals from the output face of said waveguiding layer.

2. A unit as in claim 1 wherein said integrated-circuit structure includes a second portion spaced-apart from said first-mentioned portion and including additional layers comprising an amplifier.

3. A unit as in claim 2 further including means electrically connecting one of the first set of layers of said photodetecting and optical-signal-splitting means to one of the additional layers of said amplifier.

4. A unit as in claim 3 further including means connected to one of the additional layers of said amplifier for applying an output electrical signal provided by said amplifier to customer equipment associated with said unit.

5. A unit as in claim 4 wherein said input means includes an input optical fiber stub having a microlens disposed adjacent to the input face of said waveguiding layer.

6. A unit as in claim 5 wherein said output means includes an output optical fiber stub having a microlens disposed adjacent to the output face of said waveguiding layer.

7. A unit as in claim 6 wherein said photodetecting and optical-signal-splitting means includes a p-n junction disposed parallel to a portion of the longitudinal extent of said waveguiding layer.

8. A unit as in claim 7 wherein said modulator means includes a p-n junction disposed parallel to a portion of the longitudinal extent of said waveguiding layer.

9. A unit as in claim 8 wherein said amplifier comprises a heterojunction bipolar transistor.

10. A unit as in claim 9 wherein said waveguiding layer comprises $In_{0.65}Ga_{0.35}As_{0.7}P_{0.3}$.

11. A unit as in claim 10 wherein input optical signals applied to the input face of said waveguiding layer have a center wavelength of 1.55 μm.

* * * * *